(12) United States Patent
Nanba et al.

(10) Patent No.: US 6,173,024 B1
(45) Date of Patent: Jan. 9, 2001

(54) BIT STREAM REPRODUCING APPARATUS

(75) Inventors: Takahiro Nanba; Masashi Kuroda; Makoto Kumano, all of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/070,731

(22) Filed: May 1, 1998

(51) Int. Cl.[7] .......................... H04L 25/00; H04L 25/40; H04L 7/00

(52) U.S. Cl. ............................................. 375/372; 704/500

(58) Field of Search .................................. 375/372, 377; 704/201, 229, 500, 501, 503

(56) References Cited

U.S. PATENT DOCUMENTS

| | | | |
|---|---|---|---|
| 5,222,108 | * | 6/1993 | Suzuki .................................. 375/272 |
| 5,272,728 | * | 12/1993 | Ogawa . |
| 5,621,772 | * | 4/1997 | Maturi et al. .......................... 375/366 |
| 5,710,595 | * | 1/1998 | Hang et al. ........................... 348/419 |
| 5,717,693 | * | 2/1998 | Baydar et al. ........................ 370/514 |
| 5,802,122 | * | 9/1998 | Niegel .................................. 375/272 |
| 5,896,384 | * | 4/1999 | Erickson . |
| 5,953,695 | * | 9/1999 | Barazesh .............................. 704/201 |

* cited by examiner

*Primary Examiner*—Chi H. Pham
*Assistant Examiner*—Jean B. Corrielus

(57) ABSTRACT

The bit stream reproducing apparatus is comprised of a frame length counter for measuring a data length of one frame; a first calculator for calculating a data length "L1" defined from a header to a scale factor; a second calculator for calculating a data length "L2" of an audio sample; and a third calculator for executing a calculation of $E=F-(L1+L2\times12)$ based upon calculation results of the first calculator and of the second calculator, and for sending out a control signal to a muting circuit so as to instruct a muting operation in the case of E<0.

21 Claims, 9 Drawing Sheets

BIT STREAM REPRODUCING APPARATUS

BACKGROUND OF THE INVENTION

The present invention is related to a bit stream reproducing apparatus used to transfer audio data with employment of a digital leased line.

Since digital signal processing techniques are greatly advanced in which after either analog video signals or analog audio signals have been quantization-coded, signal process operations are carried out, it is easily possible to perform signal process operations of analog information. In particular, since information amounts of audio signals are small, as compared with those of video signals, signal process amounts of the audio signals per unit time required to decode the quantization-coded audio signals so as to obtain original analog audio signals are small. Therefore, these quantization-coded audio signals may be processed by way of digital signal processors and the like.

To effectively transfer information contained in digital video/audio signals, the entire digital video/audio data are subdivided into preselected amounts of digital video/audio data which will then be transferred. Moreover, since this information is compressed, the data transfer in the low rate can be realized. In particular, as to audio data, the data compressing/expanding methods such as "Moving Picture Experts Group (will be referred to as an "MPEG" hereinafter)" established in ISO/IEC SC29/WG where the data compressing/expanding method is standardized by ISO/IEC 11172-3, and this rule is standardized have been widely used in audio transfers, digital satellite broadcasting systems, and DVD with employment of digital leased lines.

As one example of bit stream data, there is an MPEG audio bit stream in which audio data which has been processed by a quantization-coding process operation and thereafter by a compression-coding process operation, quantization-coding information indicative of a quantization-coding method for this audio data, and also compression-coding information indicative of a compression-coding method for the audio data are subdivided into a plurality of packet data, and synchronization data representative of a starting position thereof is added thereto.

FIG. 7A is a diagram for representing a data structure of an MPEG audio bit stream. Audio Access Units (will be referred to as an "AAU" hereinafter) 100 are transferred one by one in a time sequential manner in unit of packet data reproducible as audio data. In the case of MPEG 1 audio layer 1, assuming now that a sampling frequency is selected to be Fs(KHz), AAU is defined as follows:

AAU(1 frame)=(384×bit rate)/Fs[bit].

In the case of MPEG1 audio layer 2, AAU is defined as follows:

AAU(1 frame)=(1125×bit rate)/Fs[bit].

As represented in FIG. 7B, the AAU 100 of this MPEG1 audio layer 1 is arranged by a 32-bit header 101, a 16-bit CRC 102, audio data 103 whose length is variable by a bit rate, and ancillary data 104. In the case of MPEG1 audio layer 1, as indicated in FIG. 7C, the audio data 103 is arranged by bit allocation information 106, a scale factor 107, and audio sample data (0 to 11) 14D.

Also, in the case of MPEG1 audio layer 2, as indicated in FIG. 8, the audio data 103 is arranged by bit allocation information 106, scale factor selection information 120, a scale factor 107, and audio sample data (0 to 11) 140.

Furthermore, the header 101 indicated in FIG. 7C is arranged by a 12-bit syncword 109, various information ID 110, a layer 111, a protection bit 112, a bit rate index 113, a sampling frequency 114, and the like, as shown in FIG. 7D.

Normally, in order that not only bit stream data, but also the MPEG audio bit stream are detected to be dataprocessed, the following process operation is carried out.

That is, the header 101 is provided at a head of detection data, into which a sync signal having a specific value is inserted, and when this sync signal is detected, the data detection is commenced.

The 16-bit data CRC 102 shown in FIG. 7C corresponds to error checking data. Since this data CRC is decoded, a quality of transferred data (to check whether or not there is a failure, e.g., data changes occurred in data transfer operation) can be checked.

FIG. 9 is a block diagram for indicating a conventional bit stream reproducing apparatus for the MPEG audio bit stream. In this drawing, reference numeral 201 shows a syncword detector, reference numeral 220 indicates a buffer, and reference numeral 202 denotes a CRC checking circuit. Also, reference numeral 203 represents a bit stream dividing device, reference numeral 204 shows a side information decoder, reference numeral 205 indicates a dequantizing device, reference numeral 206 is a denormalizing device, and reference numeral 207 denotes a sub-band combiner. The buffer 220, and the above-described circuits 202 to 207 constitute a bit stream decoder 210.

Next, a signal flow will now be simply explained.

The MPEG audio bit stream is inputted to the syncword detector 201 by which the syncword 109 is detected. In the case that the syncword 109 is detected, since the data starting position of the AAU 100 is determined, the data subsequent to the syncword 109 contained in the header 101 are detected.

Next, after all of the information contained in the header 101 have been detected by the syncword detector 201, a predetermined amount of data is stored into the buffer 220. The data outputted from the buffer 220 is CRC-checked by the CRC checking circuit 202. It should be noted that since the CRC data is optional in the MPEG audio bit stream, only when the protection bit 112 contained in the header 101 is equal to "1", the CRC data 102 is added.

The data outputted from the CRC checking circuit 202 is entered into the bit stream dividing device 203. This bit stream dividing device 203 divides the inputted data into each of information units such as bit allocation information 106, scale factor 107, and audio sample data 140. In particular, both the bit allocation information 106 and the scale factor 107 are outputted to the side information decoder 204.

In the side information decoder 204, both the bit allocation information 106 and the scale factor 107 which correspond to the side information are decoded to produce bit numbers, namely bit allocation data for determining a data length of each of audio samples, and also a scale factor corresponding to a coefficient value used in a calculation for this bit allocation. These bit numbers are allocated to each of the audio samples during the dequantizing operation. Then, these bit numbers and scale factors are sent out to the dequantizing device 205 and the denormalizing device 206.

In the dequantizing device 205, the audio data samples 140 are dequantized based upon the output data (namely, information such as quantizing bit number) from the side information decoder 204. The denormalizing device 206 multiplies the output derived from the dequantizing device 205 by the scale factors entered from the side information decoder 204. Since the MPEG audio data is divided into 32 audio subdata by the highspeed Fourier transform during the coding operation, the calculation results of the denormalizing device 206 are recombined with each other by the sub-band combiner 207 to thereby produce the original digital audio signal.

Since the conventional bit stream reproducing apparatus is arranged in the above-described manner, in such a case that the bit allocation information 106 corresponding to partial data contained in the inputted MPEG bit stream signal could not be correctly transferred due to occurrences of the transfer noise, the data length of the subsequently transferred audio sample data 140 and the data starting position of the audio sample data to be dequantized are erroneously recognized. As a result, there is a problem that acoustic noise may occur.

Also, in such a case that the inputted MPEG bit stream signal could not be correctly transferred due to noise, for instance, when such an erroneous detection is made that the syncword 109 indicative of the data starting position is now located at a position after the normal position of the syncword 109, a data length of one frame would be erroneously recognized as a data length longer than the actual data length. Since this implies that the next frame information is reproduced as the present frame information, the frame information would be dropped out.

Further, in the case that either a portion or an entire portion of the scale factor information corresponding to partial data contained in the inputted MPEG bit stream could not be correctly transferred, since the calculation in the denormalizing device 206 corresponding to the signal process operation at the post stage could not be carried out, there is another problem that acoustic noise may be produced.

SUMMARY OF THE INVENTION

The present invention has been made to solve the above explained problems, and therefore, has an object to provide a bit stream reproducing apparatus capable of producing reproduced sounds with better sound qualities even when an input bit stream could not be correctly transferred.

A bit stream reproducing apparatus, according to a first aspect of the present invention, comprises: an input buffer for storing a predetermined amount of the bit stream data entered therein; a frame length counter for calculating a data length of the packet data; and an overflow detector for detecting an overflow of the input buffer.

Also, a bit stream reproducing apparatus, according to a second aspect of the present invention, comprises: an underflow detector for representing an underflow condition of data stored in a buffer employed in an input unit of a bit stream decoder; and a data interpolating circuit for interpolating data in response to a control signal derived from the underflow detector.

Also, a bit stream reproducing apparatus, according to a third aspect of the present invention, comprises: an underflow detector for representing an underflow condition of data stored in a buffer employed in an input unit of a bit stream decoder; and a muting circuit for executing a muting operation in response to a control signal derived from the underflow detector.

Also, a bit stream reproducing apparatus, according to a fourth aspect of the present invention, comprises: an input buffer for storing a predetermined amount of the bit stream data entered therein; a frame length counter for calculating a data length of the packet data; a first calculator for calculating a data length "L1" defined from the synchronization data up to the compression-coding information; a second calculator for calculating a data length "L2" of audio data firstly detected from a plurality of audio data contained in one piece of the packet data based upon decoded compression-coding information; a third calculator for executing a calculation of E=F−(L1+L2×12) based upon an output value "F" of the frame length counter, an output value "L1" of the first calculator, and an output value "L2" of the second calculator, and for outputting a control signal in case of E<0; and either a muting circuit or interpolation processing means of executing an attenuation process operation with respect to output data of a bit stream decoder in response to the control signal.

Also, a bit stream reproducing apparatus, according to a fifth aspect of the present invention, comprises: a data comparator for comparing the decoded result of the bit stream decoder with an irregular data value, and for outputting said control signal when the decoded result of the bit stream decoder is made coincident with the irregular data value.

In a bit stream reproducing apparatus according to the present invention, when continuous syncwords could not be detected, an input bit stream derived from an input buffer is outputted in unit of one frame to a bit stream decoder.

Also, a buffer employed in the bit stream decoder is brought into an underflow state, dropped data is interpolated.

Also the buffer employed in the bit stream decoder is brought into an underflow state, dropped data is processed by a muting process operation.

Also, reproduced sound is attenuated, or muted based on a calculation result of a third calculator.

Also, the reproduced sound is muted based on a comparison result by a data comparator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are mitative of the present invention, and wherein.

DETAILED DESCRIPTION OF THE PREFERRED EMBODIMENTS

Referring now to drawings for representing embodiment modes, the present invention will be explained more in detail.

First Embodiment

Figure 1:
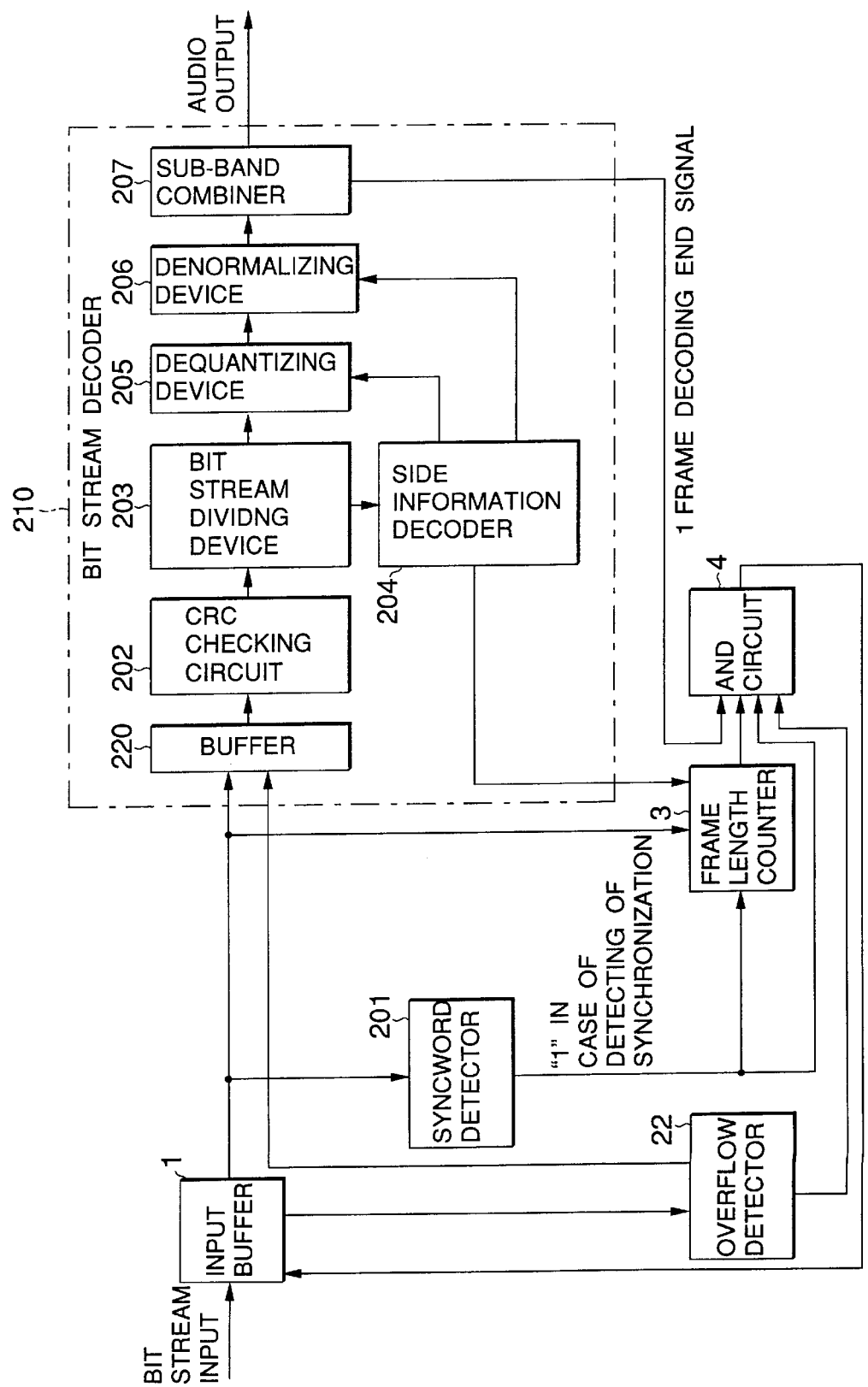
FIG. 1 is a block diagram for indicating a bit stream reproducing apparatus according to first embodiment of the present invention.

FIG. 1 is a schematic block diagram for showing a bit stream reproducing apparatus according to first embodiment of the present invention.

In FIG. 1, reference numeral 1 shows an input buffer, reference numeral 3 indicates a frame length counter, reference numeral 4 denotes an AND circuit, reference numeral 22 represents an overflow detector, reference numeral 201 is a syncword detectors and reference numeral 210 denotes a bit stream decoder. The bit stream decoder is arranged by the buffer 200, the CRC checking circuit 202, the bit stream dividing device 203, the side information decoder 204, the dequantizing device 205, the denormalizing device 206, and the sub-band combiner 207. Since these circuit elements of this bit stream decoder may perform similar signal processing operations, detailed operations thereof are omitted.

A description will now be made of operations in such a case that data of the MPEG1 audio layer 1 is entered as a bit stream input into the bit stream reproducing apparatus with employment of the above-described circuit arrangements.

First, the bit stream data is inputted into the input buffer 1. Normally, when a preselected amount of data is stored into this input buffer 1, the data is outputted to the syncword detector 201 provided at the post stage of this input buffer 1.

It should be understood that, as indicated in FIG. 1, this input buffer 1 is controlled according to an output value of the AND circuit 4. Only when the output of the AND circuit 4 becomes "1", does this input buffer 1 output the data to the syncword detector 201 at the post stage thereof. However, when the output of the AND circuit 4 becomes "0", this input buffer 1 does not supply the data to this syncword detector 201.

In this case, when first bit stream data is entered into the input buffer 1, the output of the AND circuit 4 is set to an initial value of "1", so that the bit stream data stored in the input buffer 1 is entered into the syncword detector 201.

The overflow detector 22 detects the amount of data stored in the input buffer 1. When the input buffer 1 is brought into an overflow condition, this overflow detector 22 supplies a reset signal used to reset the decoding process of the bit stream decoder 210 to this bit stream decoder 210, and further outputs such a signal capable of indicating the overflow condition to the AND circuit 4, for example, outputs data of "1" to this AND circuit 4.

In the syncword detector 201, 12-bit syncword 109 contained in the header 101 is retrieved. This syncword 109 is set to a fixed value, for example, the hexadecimal number of "FFF", so that this syncword 109 can be detected.

In the case that the syncword 109 is detected, the syncword detector 201 produces such an output value of "1" in order to indicate such a fact that the syncword 109 is detected, namely the header 101 of the AAU 100 is entered, and then supplies this output value of "1" to the frame length counter 3 and the AND circuit 4.

As to the bit stream signal outputted from the input buffer 1, the bit stream decoder 210 firstly detects the information other than the syncword 109 with respect to the 32-bit header 101, and then decodes this information. In particular, three sorts of information contained in this bit stream signal are supplied to the frame length counter 3, namely the 2-bit layer 111, the 4-bit bit rate index 113, and the 2-bit sampling frequency 114 shown in FIG. 7D.

After the bit stream decoder 210 detects the above-described header information to decode this detected head information, the bit stream decoder 210 detects the audio sample data 140 to thereby output a reproduced audio signal by decoding this audio sample data 140. Further, this bit stream decoder 210 outputs such a signal for indicating that the decoding process operation of one frame is ended to the AND circuit 4, for example, outputs data of "1" to this AND circuit 4.

Upon receipt of the output data produced when the syncword detector 201 detects the syncword 109, the frame length counter 3 commences the counting operation of the frame length, and further calculates a data length "F" of one frame of the input bit stream from the three sets of information, namely the layer 111, the bit rate index 113, and the sampling frequency 114, which as entered from the bit stream decoder 210.

Also, the count timing of this frame length counter 3 is synchronized with the data output timing of the input buffer 1. As a result, in the normal bit stream data, in the case that the count value of one frame in the frame length counter 3 is equal to "F", namely the counting operation of one frame by the frame length counter 3 is completed, the syncword 109 is detected by the syncword detector 201 at the same time. The frame length counter 3 when the counting operation of one frame is accomplished outputs a value for indicating the end of this 1-frame counting operation, for example, data of "1" is outputted to the AND circuit 4.

The AND circuit 4 AND-gates four sets of output data, namely the output data from the frame length counter 3, the output data from the syncword detector 201, such an output data derived from the overflow detector 22 for indicating that the decoding operation of the one frame data is accomplished, and the output data from the overflow detector 22. Such a case that the output from the AND circuit 4 becomes 0 corresponds to such a case that even one of the following four conditions can be satisfied. That is, there are a first condition that the 1-frame counting operation of the input bit stream data by the frame length counter 3 is not yet accomplished; a second condition that the syncword detector 201 could not detect the syncword 109; a third condition that the bit stream decoder 210 has not yet accomplished the 1-frame data decoding process; and a fourth condition that the overflow detector 22 is detecting the overflow condition of the input buffer 1. At this time, the AND circuit 4 sends, for instance, a signal of "0" to the input buffer 1, so that this AND circuit 4 does not supply the data to the post-staged circuit of the input buffer 1.

It is apparently possible to realize these operations of the syncword detector 201, frame length counter 3, AND circuit 4, bit stream decoder 210, and overflow detector 22 by way of either hardware process operations or software process operations by a microcomputer and the like.

It should also be noted that the AND gating process by the AND circuit 4 need not be individually set, but may be performed inside the frame length counter 3, the input buffer 1, or the overflow detector 22.

In the above descriptions, the AND circuit 4 is employed so as to AND-gate the output values derived from the syncword detector 201, the frame length counter 3, the AND circuit 4, the bit stream decoder 210, and the overflow detector 22. This AND circuit 4 need not be employed, but other logic circuits may be employed if these logic circuits are capable of controlling the input buffer 1.

It should be understood that although the above description has described one embodiment mode of the MPEG 1 audio layer 1, the above-described inventive idea may be similarly applied to a data stream resembled to the structure of the bit stream data, for instance, the MPEG 1 audio layer 2 and layer 3, and the MPEG 2 audio layer 1, audio layer 2, and layer 3, resulting in similar effects.

Second Embodiment

Figure 2:
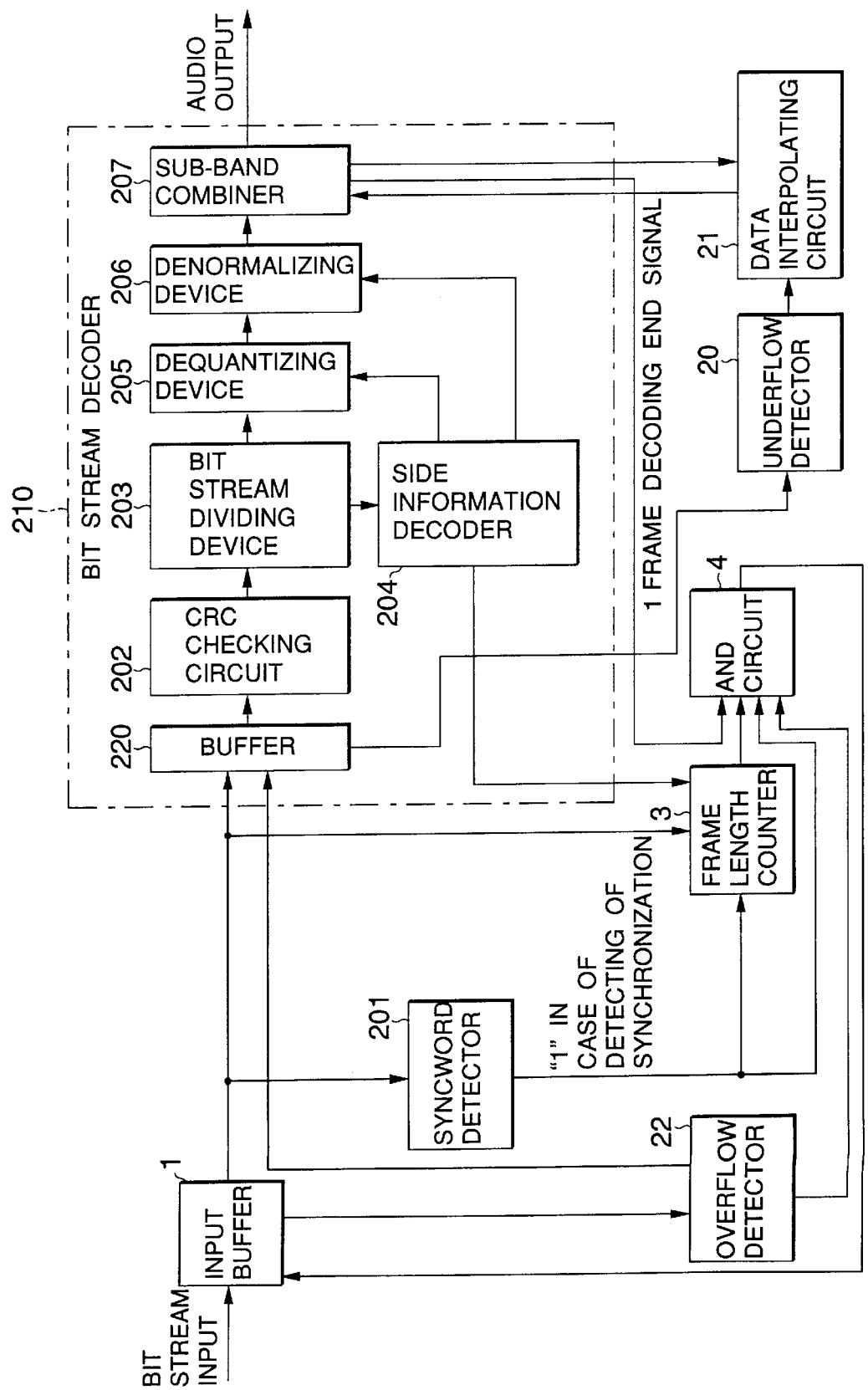
FIG. 2 is a block diagram for indicating a bit stream reproducing apparatus according to second embodiment of the present invention.

FIG. 2 is a schematic block diagram for showing a bit stream reproducing apparatus according to an embodiment mode 2 of the present invention. The same reference numerals shown in FIG. 1 are employed as those for denoting the same, or similar circuit arrangements. In FIG. 2, reference numeral 20 shows an underflow detector, and reference numeral 21 indicates a data interpolating circuit.

A description will now be made of operations about different circuit arrangements from those of the first embodiment.

In the case that bit stream data is normally transferred, both the bit stream data entered into the input buffer 1 and the data outputted from the input buffer 1 to the bit stream decoder 210 are input/output-processed in unit of a specific data length without any over data and a shortage of data.

However, in the case that a portion of the bit stream data is dropped out due to some reasons, the data length of the data inputted into the buffer 220 employed in the bit stream decoder 210 is shorter than the originally outputted data length. Then, the underflow detector 20 compares a length of data inputted into the buffer 220 employed in the bit stream decoder 210 with another length of data outputted from this buffer 220, and then calculates a difference "D" between the data length of the input data and the data length of the output data based on the following formula:

D=(length of input data)−(length of output data)

In the case of D<0, the underflow detector 20 outputs the value of this difference "D" to the data interpolating circuit 21 provided at the post stage of this underflow detector 20.

The data interpolating circuit 21 forms interpolation data with respect to the dropped data from this value of D<0, and the data detected by the bit stream decoder 210.

Thus, the formed interpolation data is entered into the bit stream decoder 210, and then is added to the dropped data portion of the bit stream data in the bit stream decoder 210. The resultant bit stream data is processed by the normal decoding operation to be outputted as audio output data from the bit stream decoder 210.

It should be understood that although the above description has described one embodiment mode of the MPEG1 audio layer 1, the above-described inventive idea may be similarly applied to a data stream resembled to the structure of the bit stream data, for instance, the MPEG1 audio layer 2 and layer 3, and the MPEG2 audio layer 1, audio layer 2, and layer 3, resulting in similar effects.

Third Embodiment

Figure 3:
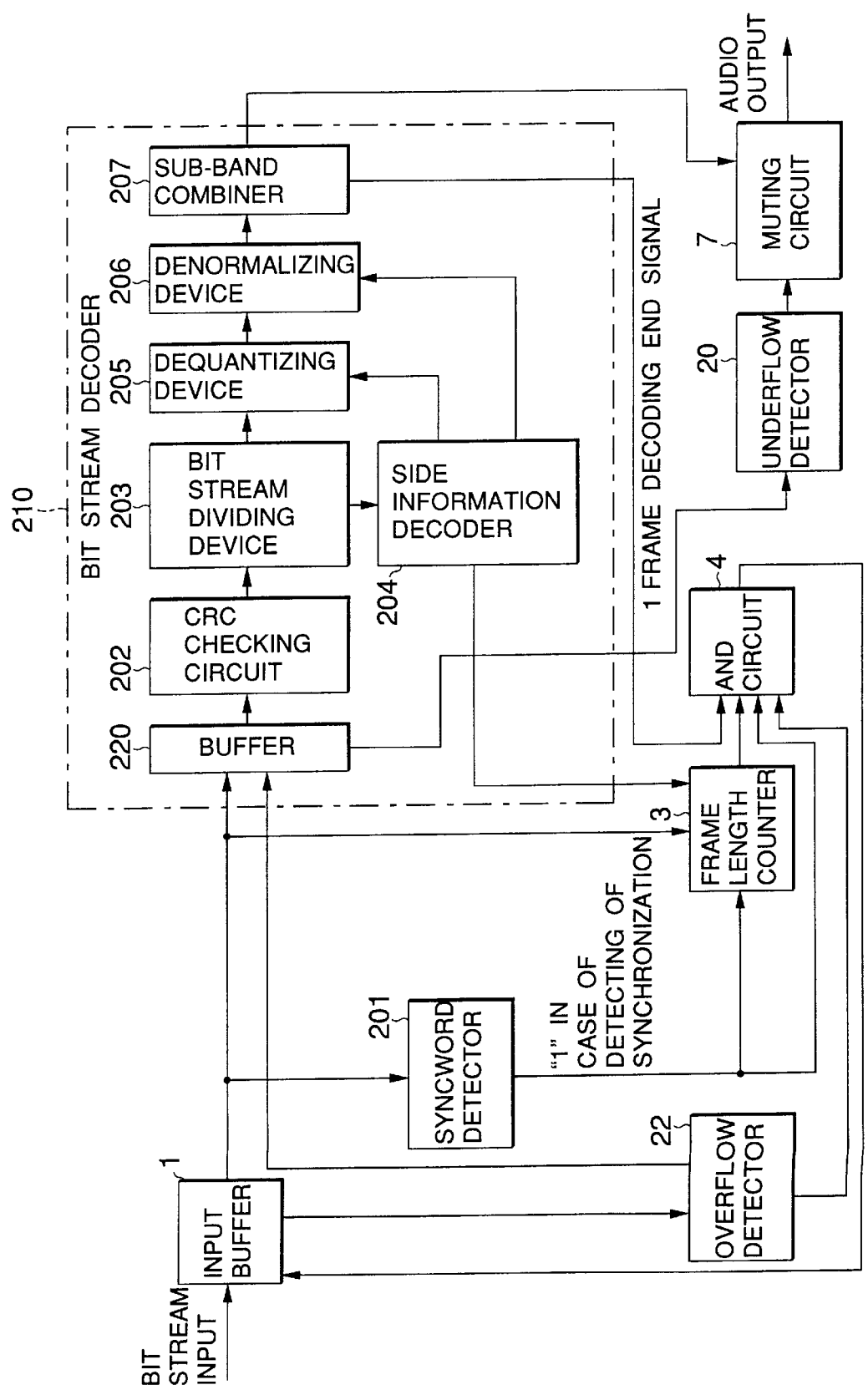
FIG. 3 is a block diagram for indicating a bit stream reproducing apparatus according to third embodiment of the present invention.

FIG. 3 is a schematic block diagram for showing a bit stream reproducing apparatus according to third embodiment of the present invention. The same reference numerals shown in FIG. 2 are employed as those for denoting the same, or similar circuit arrangements. In FIG. 3, reference numeral 7 shows a muting circuit.

Now, operations of different circuit arrangements from those of the embodiment mode 2 will be explained as to such a case that an underflow state occurs in the buffer 220 employed in the bit stream decoder 210.

When the underflow detector 20 judges such a fact that an underflow state happens to occur in input data of the buffer 220, this underflow detector 20 outputs such data for indicating that the bit stream data where the underflow state happens to occur is detected to the muting circuit 7.

The decoded data which has been decoded by the bit stream decoder 210 and in which the underflow state happens to occur is entered into the muting circuit 7. The muting circuit 7 mutes the output value of the bit stream decoder 210 based on the above detected data.

It should be understood that although the above description has described one embodiment mode of the MPEG1 audio layer 1, the above-described inventive idea may be similarly applied to a data stream resembled to the structure of the bit stream data, for instance, the MPEG1 audio layer 2 and layer 3, and the MPEG2 audio layer 1, audio layer 2, and layer 3, resulting in similar effects.

Fourth Embodiment

Figure 4:
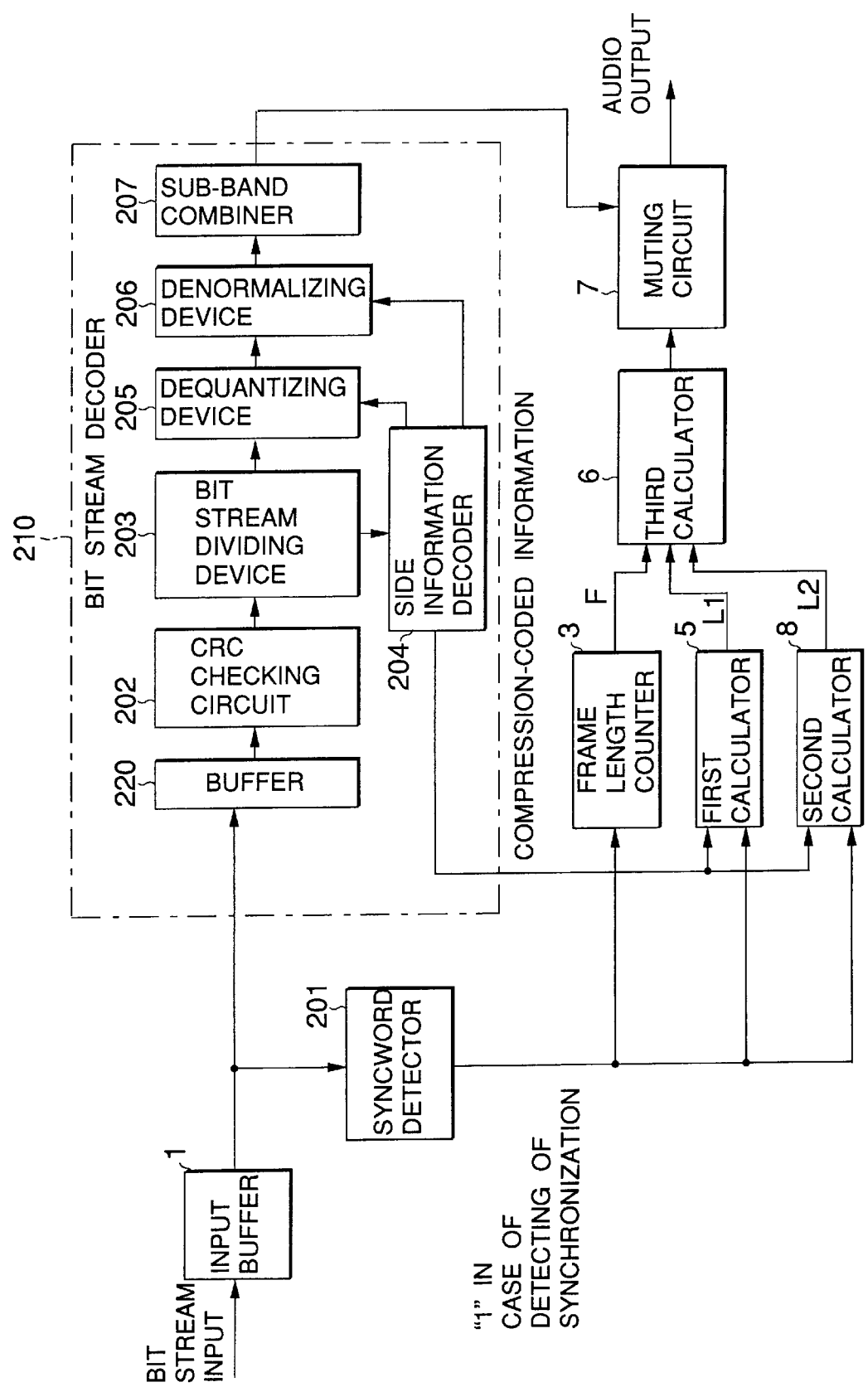
FIG. 4 is a block diagram for indicating a bit stream reproducing apparatus according to fourth embodiment of the present invention.

FIG. 4 is a schematic block diagram for showing a bit stream reproducing apparatus according to fourth embodiment of the present invention. The same reference numerals shown in FIG. 3 are employed as those for denoting the same, or similar circuit arrangements. In FIG. 4, reference numeral 5 shows a first calculator, reference numeral 6 denotes a third calculator, and reference numeral 8 indicates a second calculator.

Now, operations of different circuit arrangements from those of the embodiment mode 3 will be explained as to such a case that the MPEG1 audio layer 1 is entered as a bit stream input.

Figure 5:
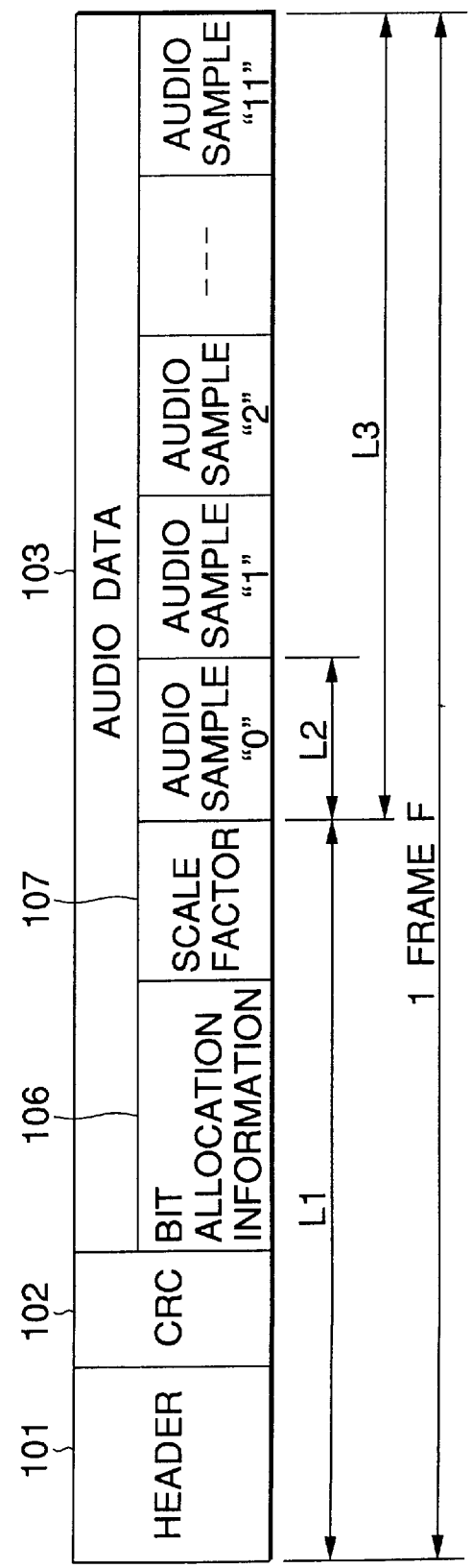
FIG. 5 represents the data structure of one frame of the MPEG1 audio layer.
Figure 7:
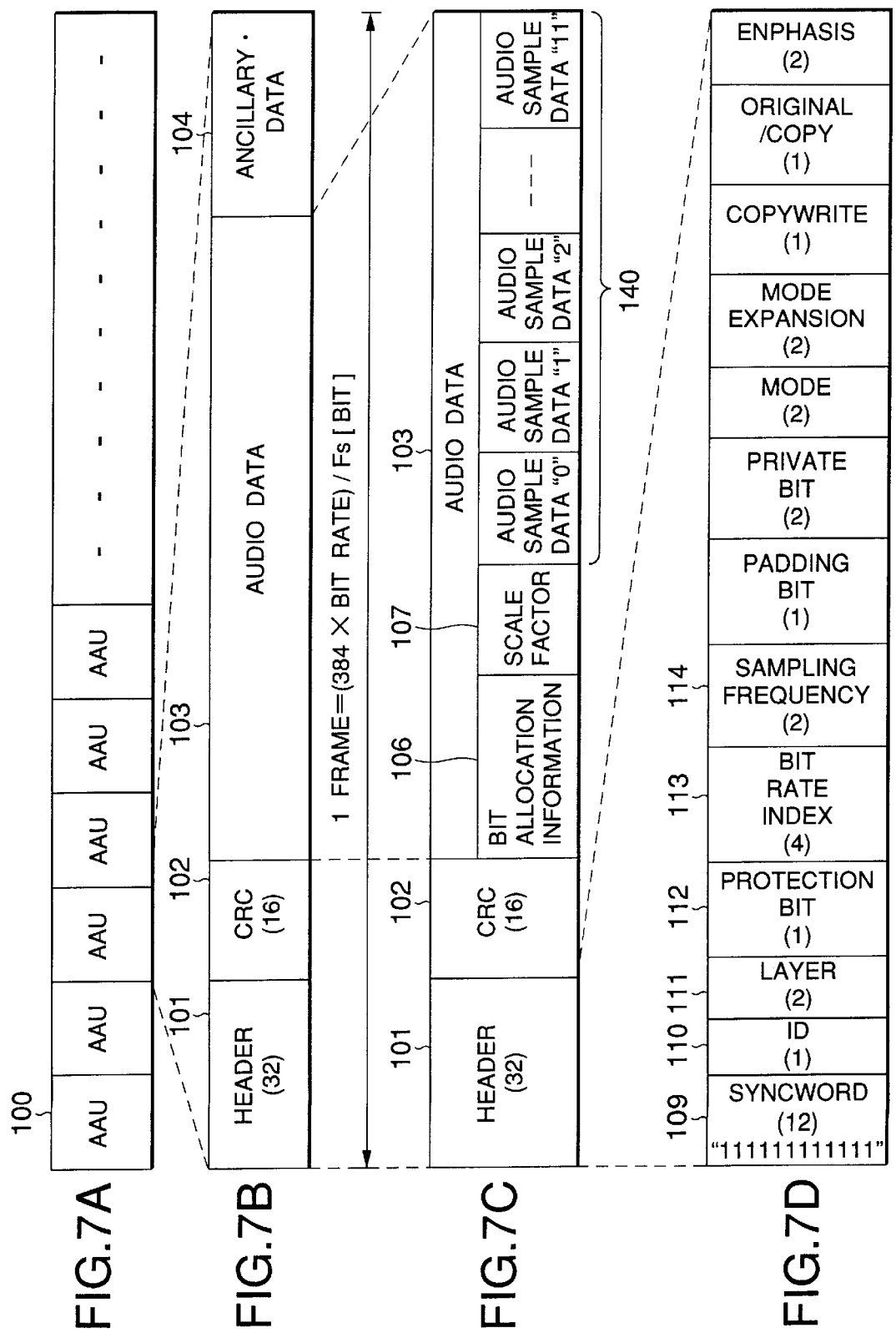
FIG. 7A–7D represent the data structure of the MPEG audio bit stream, and the data structure of one frame of the MPEG1 audio layer.
Figure 8:
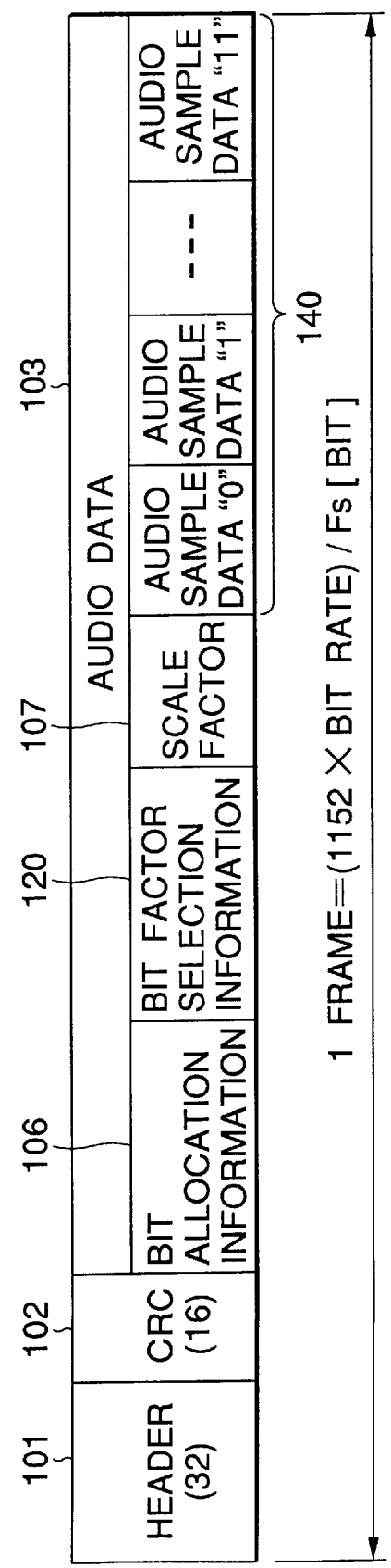
FIG. 8 shows the data structure of one frame of the MPEG1 audio layer.
Figure 9:
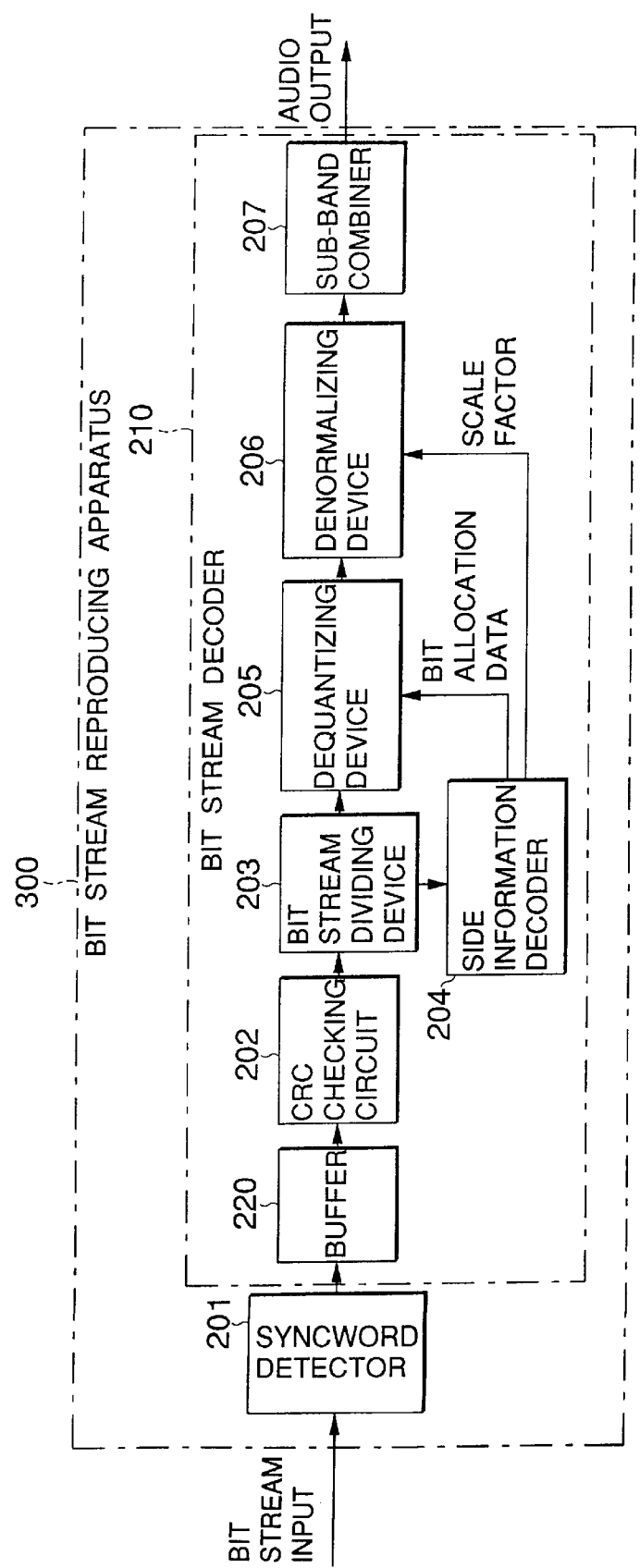
FIG. 9 is a block diagram for indicating the conventional bit stream reproducing apparatus.

FIG. 5 represents data lengths of the respective data shown in FIG. 7C, namely the header 101, the CRC 102 data 102, and the audio data 103 contained in the AAU 100. In this drawing, symbol "L1" indicates a data length defined from the header 101 to the scale factor 107, symbol "L2" shows a data length of an audio sample "0", symbol "L3" denotes a data length defined from the audio sample "0" to an audio sample "11", and symbol "F" shows a data length of one frame of the MPEG1 audio layer 1.

In FIG. 4, bit stream data outputted from the input buffer 1 is entered into the bit stream decoder 210. Then, the frame length judgement information of the layer 111, the bit rate index 113, and the sampling frequency 114 contained in the header 101 indicated in FIG. 7C is detected to be decoded by this bit stream decoder 210. Furthermore, the bit allocation information 106 and the scale factor 107 contained in the audio data 103 are also detected to be decoded by the bit stream decoder 210.

In the case of the MPEG1 audio layer 1, there are 12 pieces of audio sample data within one frame. Since the bit allocation information 106 indicate the respective data lengths of 12 pieces of these audio sample data and, for instance, all 12 pieces of audio sample data own the same data lengths, if the data length "L2" of the first audio sample data 108 can be recognized, then all of the data lengths owned by 12 pieces of audio sample data within one frame can be recognized.

The first calculator 5 calculates the data length "L1" defined from the header 101 to the scale factor 107 shown in FIG. 5 based upon the output signal from the syncword detector 201, the bit allocation information 106 decoded by the bit stream decoder 210, and the scale factor 107 decoded by this bit stream decoder 210.

The second calculator 8 calculates the data length "L2" of the audio sample shown in FIG. 5 based upon the output signal from the syncword detector 201, and the bit allocation information 106 decoded by the bit stream decoder 210.

The third calculator 6 executes the following calculation with respect to the data length L2 of the audio sample 108, the data length "F" of one frame corresponding to the calculation result of the frame counter 3, and the data length "L1" defined from the header 101 to the scale factor 107:

E=F−(L1+L2×12)

When the calculation result "E" is equal to E<0, this third calculator 6 outputs to the muting circuit 7, data of "1" corresponding to a control signal used to perform a muting process operation by this muting circuit 7. In response to this control signal the muting circuit 7 executes either the muting process operation or the interpolating process operation.

It should be understood that the above-described first calculator 5, second calculator 8, third calculator 6, and muting circuit 7 may be apparently realized by using software process operations by a microcomputer.

Alternatively, the calculation process operations by the above-explained first calculator 5, second calculator 8, and third calculator 6 may be executed by employing a single microcomputer.

Also, it should be noted that the muting circuit 7 need not mute the output data of the bit stream decoder 210. Alternatively, if any means is capable of achieving a similar effect as that of this muting circuit 7, then a muting means may be provided at any other position, for example, in a half way of the decoding process stages by the bit stream decoder 210.

It should be understood that although the above description has described one embodiment mode of the MPEG 1 audio layer 1, the above-described inventive idea may be similarly applied to a data stream resembled to the structure of the bit stream data, for instance, the MPEG 1 audio layer 2 and layer 3, and the MPEG 2 audio layer 1, audio layer 2, and layer 3, resulting in similar effects.

Fifth Embodiment

Figure 6:
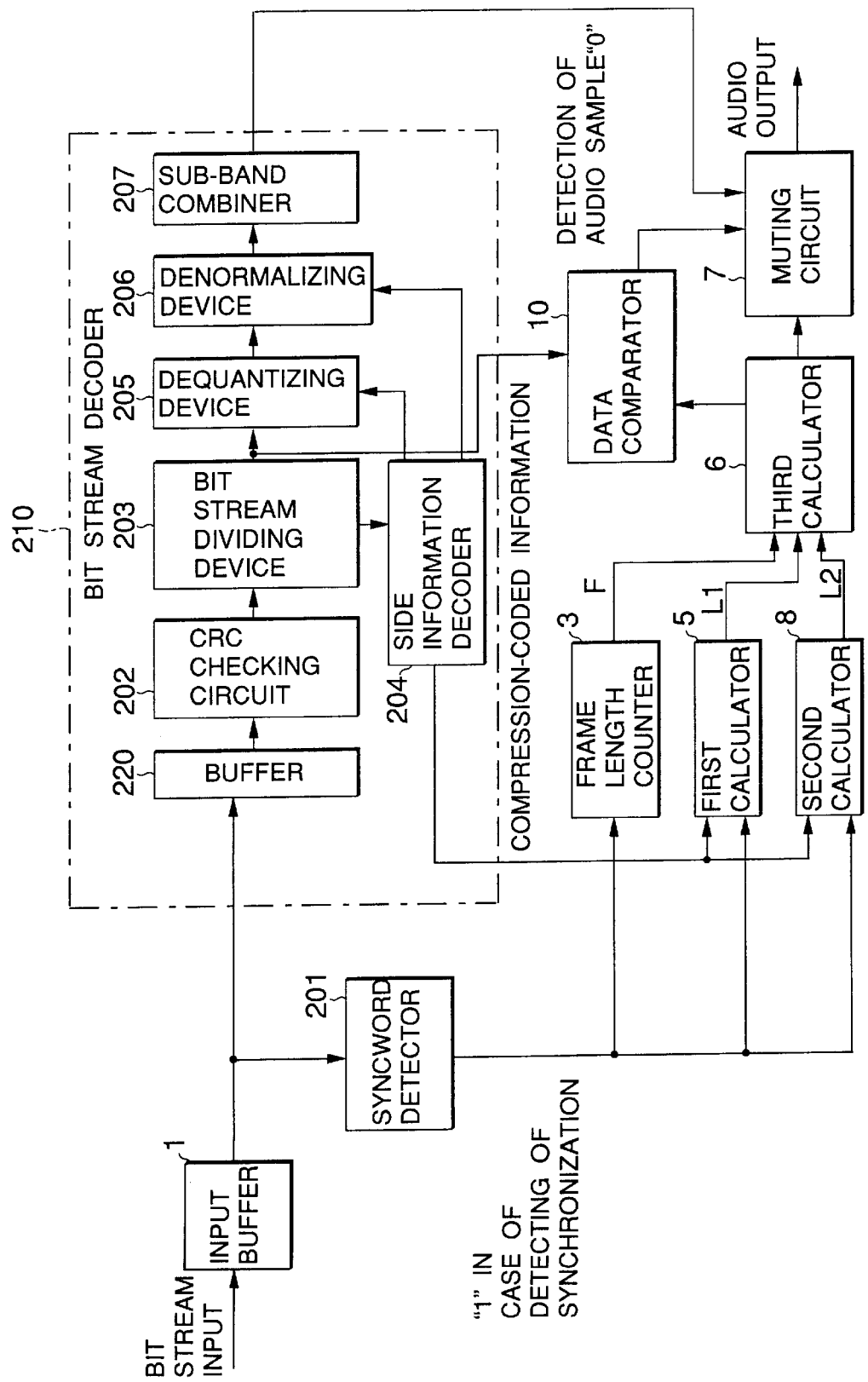
FIG. 6 is a block diagram for indicating a bit stream reproducing apparatus according to fifth embodiment of the present invention.

FIG. 6 is a schematic block diagram for showing a bit stream reproducing apparatus according to fifth embodiment of the present invention. The same reference numerals shown in FIG. 4 are employed as those for denoting the same, or similar circuit arrangements. In FIG. 6, reference numeral 10 shows a data comparator.

A description will now be made of operations about different circuit arrangements from those of the fourth embodiment.

In the case that a calculation result by the third calculator 6 is equal to E>0, this third calculator 6 sends a command signal to the data comparator 10 so as to execute the data comparison. A decoded result of the audio sample data "0" shown in FIG. 5 is entered from the bit stream decoder 210 to the data comparator 10.

In the MPEG audio bit stream, normally such information is present in the audio sample data "0", the bit allocation information 106, and the scale factor 107, and this information is not originally required. For example, there is a some risk that such a bit stream of "111111111111" is mistakenly recognized as the syncword 109 within the audio sample data "0". As a consequence, the normal bit stream data is arranged by not containing such a bit stream.

Such a data stream which is not originally present in the normal audio sample data "0" is previously set in the data comparator 10. Then, the data comparator 10 compares this data stream with the decoded result of the audio sample data "0". When this data stream is made coincident with the decoded result of the audio sample data "0", namely when a detection is made of such a data stream which is not originally present, this data comparator 10 outputs a control signal to the muting circuit 7 in order that this muting circuit 7 executes the muting process operation, or the interpolation process operation.

In the above-described operations, the decoded result of the audio sample data "0" is compared with the preset data stream by the data comparator 10 to execute the muting process operation. Alternatively, even when the data comparison is made based upon such a decoded result with respect to an arbitrary value defined from the audio sample data "1" to the audio sample data "11", a similar effect may be achieved.

It should be understood that although the above description has described one embodiment mode of the MPEG 1 audio layer 1, the above-described inventive idea may be similarly applied to a data stream resembled to the structure of the bit stream data, for instance, the MPEG 1 audio layer 2 and layer 3, and the MPEG 2 audio layer 1, audio layer 2, and layer 3, resulting in similar effects.

Since the bit stream reproducing apparatus of the present invention has been arranged as explained above, there are the below-mentioned effects.

In accordance with the first aspect of the present invention, even when the quasi-syncword caused by mixing the noise and the like happens to occur between the normal syncwords existing in the bit stream data, the synchronization of one frame can be correctly maintained. As a result, the stable reproduction sound can be provided, and also the data drops for one frame can be avoided which are caused by erroneously decoding the data with respect to the quasi-syncword.

In accordance with the second aspect of the present invention, in such a case that the information drops out from the bit stream data entered into the input buffer, the interpolation process operation is carried out by adding the interpolation data to this information-dropped data portion. As a result, the occurrence of the acoustic noise while the audio data is reproduced due to the data drops can be suppressed at minimum.

In accordance with the third aspect of the present invention, in such a case that the information drops out from the bit stream data entered into the input buffer, the muting process operation is carried out with respect to such a frame in which this dropped information is present. As a consequence, the occurrence of the acoustic noise while the audio data is reproduced due to the data drops can be suppressed at minimum.

In accordance with the fourth aspect of the present invention, even when a portion of the compressed/coded information contained within one frame is destroyed, or dropped, due to noise, at a time instant when the first audio sample data of 12 pieces of audio sample data present in one frame is decoded, such a judgement is made that the information of this one frame contains the failure. As a result, either the muting process operation or the interpolating process operation is automatically performed.

As a consequence, it is possible to prevent the occurrence of the acoustic noise without waiting the completion of reproducing of one frame. Furthermore, all of 12 pieces of audio sample data need not be decoded in order to execute the data judging process operation used to carry out either the muting process operation or the interpolating process operation. Accordingly, the memory capacity of the buffers required to execute the data judging process operation can be set to a small value, so that the bit stream reproducing apparatus can be made in low cost.

In accordance with the fifth aspect of the present invention, such data is detected from the decoded audio sample data, which has been destroyed, or dropped due to noise. Since the audio output of the detected frame are processed by either the muting process operation or the interpolating process operation, it is possible to avoid the occurrence of the acoustic noise while the audio data is reproduced.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A bit stream reproducing apparatus for reproducing bit stream data from audio data having been processed by a quantization-coding process operation and by a compression-coding process operation, quantization-coding information indicative of a quantization-coding method for the audio data, and compression-coding information indicative of a compression-coding method for the audio data are subdivided into a plurality of packet data, and synchronization data representative of a starting position of the bit stream data is added, said bit stream reproducing apparatus comprising:

an input buffer for storing a predetermined amount of the bit stream data entered therein;

a frame length counter for calculating a data length of the packet data;

an overflow detector for detecting an overflow of said input buffer; and a synchronization data detector for detecting the synchronization data;

wherein said input buffer is controlled according to the data length of the packet data, the overflow of said input buffer and the detection of the synchronization data.

2. A bit stream reproducing apparatus as claimed in claim 1, further comprising:

an underflow detector for representing an underflow condition of data stored in a buffer employed in an input unit of a bit stream decoder; and a data interpolating circuit for interpolating data in response to a control signal derived from said underflow detector.

3. A bit stream reproducing apparatus as claimed in claim 1, further comprising: an underflow detector for representing an underflow condition of data stored in a buffer employed in an input unit of a bit stream decoder; and a muting circuit for executing a muting operation in response to a control signal derived from said underflow detector.

4. A bit stream reproducing apparatus for reproducing bit stream data from audio data having been processed by a quantization-coding process operation and by a compression-coding process operation, quantization-coding information indicative of a quantization-coding method for the audio data, and compression-coding information indicative of a compression-coding method for the audio data are subdivided into a plurality of packet data, and synchronization data representative of a starting position of said bit stream data is added, said bit stream reproducing apparatus comprising:

an input buffer for storing a predetermined amount of said bit stream data entered therein;

a frame length counter for calculating a data length of said packet data;

a first calculator for calculating a data length "L1" defined from the synchronization data up to the compression-coding information;

a second calculator for calculating a data length "L2" of audio data firstly detected from a plurality of audio data contained in one piece of the packet data based upon decoded compression-coding information; and a third calculator for executing a calculation of $E=F-(L1+L2 \times M)$ based upon an output value of "F" of said frame length counter, an output value "L1" of said first calculator, and an output value "L2" of said second calculator, and for outputting a control signal in case of $E<0$, wherein M is equal to a number of audio samples in each frame.

5. A bit stream reproducing apparatus as claimed in claim 4 further comprising: one of a muting circuit for executing an attenuation process operation with respect to output data of a bit stream decoder in response to said control signal; and an interpolation processing means for executing an interpolation process operation with respect to output data of a bit stream decoder in response to said control signal.

6. A bit stream reproducing apparatus as claimed in claim 4 further comprising a muting circuit for executing an attenuation process operation with respect to output data of a bit stream decoder in response to said control signal.

7. A bit stream reproducing apparatus as claimed in claim 4 further comprising an interpolation processing means for executing an interpolation process operation with respect to output data of a bit stream decoder in response to said control signal.

8. A bit stream reproducing apparatus as claimed in claim 4, further comprising:

a data comparator for comparing a decoded result of a bit stream decoder with an irregular data value, and for outputting said control signal when said decoded result of the bit stream decoder is made coincident with said irregular data value.

9. A bit stream reproducing apparatus according to claim 4, wherein M=12.

10. An apparatus for improving a quality of audio data output from a decoding device, comprising:

an input buffer operatively connected to the decoding device, said input buffer receiving a bit stream input and having a buffer capacity;

a syncword detector operatively connected to said input buffer;

a frame length counter operatively connected to said syncword detector;

an overflow detector operatively connected to said input buffer;

wherein said input buffer outputs a frame of the bit stream input to the decoding device based on outputs from said syncword detector, said frame length counter, said overflow detector and a decoding end signal from the decoding device.

11. The apparatus according to claim 10, further comprising:

a logical circuit operatively connected to said syncword detector, said frame length counter, said overflow detector and a line inputting the decoding end signal, said logical circuit performing a logical operation and outputting a control signal to said input buffer, said input buffer outputting the frame to the decoding device according to the control signal.

12. The apparatus according to claim 11, wherein said logical circuit is an AND circuit.

13. The apparatus according to claim 10, further comprising:

an underflow detector operatively connected to an input buffer of the decoding device; and a data interpolating circuit operatively connected to said underflow detector, said data interpolating circuit interpolating data output from the decoding device when said underflow detector detects underflow of the decoding device input buffer.

14. The apparatus according to claim 10, further comprising:

an underflow detector operatively connected to an input buffer of the decoding device; and a muting circuit operatively connected to said underflow detector, said muting circuit attenuating data output from the decoding device when said underflow detector detects underflow of the decoding device input buffer.

15. A method for processing coded audio data, comprising:

receiving a frame of bit stream of coded audio data;

detecting a synchronization data in the frame;

calculating a first frame length value based on information contained in the frame;

calculating a second frame length value based on said detecting step;

decoding the frame; and compensating the decoded frame when the first frame length value does not coincide with the second frame length value to improve the quality of sound, wherein said calculating a second frame length value calculates the second frame length value based on the bit allocation information contained in the frame and a scale factor contained in the frame.

16. The method according to claim 15, said calculating a first frame length value calculating the first frame length value from a header of the frame.

17. The method according to claim 16, said calculating a first frame length value calculating the first frame length value from a layer data, a bit rate index, and a sample frequency.

18. The method according to claim 15, said calculating a second frame length value further calculating the second frame length value based on a number of audio samples in each frame.

19. The method according to claim 15, said compensation step attenuating at least a portion of the decoded frame.

20. The method according to claim 15, said compensation step interpolating data for at least a portion of the decoded frame.

21. The method according to claim 15, further comprising:

comparing the decoded data with a data value;

said compensating step compensating the decoded data based on said comparing step.

* * * * *